United States Patent
Nakatani et al.

(10) Patent No.: US 12,054,013 B2
(45) Date of Patent: Aug. 6, 2024

(54) PNEUMATIC TIRE

(71) Applicant: Sumitomo Rubber Industries, Ltd., Kobe (JP)

(72) Inventors: Masako Nakatani, Kobe (JP); Takahiro Kawachi, Kobe (JP); Ayuko Yamada, Kobe (JP); Keiichi Nakadera, Kobe (JP); Hiroshi Ito, Kobe (JP); Shuichiro Ono, Kobe (JP); Daiki Mukouguchi, Kobe (JP); Tatsuhiro Tanaka, Kobe (JP); Tetsuya Maekawa, Kobe (JP); Subaru Toya, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 415 days.

(21) Appl. No.: 16/710,940

(22) Filed: Dec. 11, 2019

(65) Prior Publication Data

US 2020/0114704 A1    Apr. 16, 2020

Related U.S. Application Data

(63) Continuation of application No. 16/066,022, filed as application No. PCT/JP2017/044581 on Dec. 12, 2017, now abandoned.

(30) Foreign Application Priority Data

Jan. 25, 2017    (JP) ................................. 2017-010922

(51) Int. Cl.
| | |
|---|---|
| B60C 1/00 | (2006.01) |
| B60C 19/00 | (2006.01) |
| B60C 11/00 | (2006.01) |

(52) U.S. Cl.
CPC .... B60C 19/002 (2013.01); *B60C 2011/0025* (2013.01)

(58) Field of Classification Search
CPC ...................... B60C 19/002; B60C 2011/0025
See application file for complete search history.

(56) References Cited

U.S. PATENT DOCUMENTS

| | | | |
|---|---|---|---|
| 4,383,085 A | 5/1983 | Fujimaki et al. | |
| 4,934,428 A | 6/1990 | Aoki et al. | |
| (Continued) | | | |

FOREIGN PATENT DOCUMENTS

| | | |
|---|---|---|
| EP | 0620129 A1 | 10/1994 |
| EP | 1659004 A1 | 5/2006 |
| (Continued) | | |

OTHER PUBLICATIONS

Mechanics of Pneumatic Tires, 1981.*

(Continued)

*Primary Examiner* — Justin R Fischer
(74) *Attorney, Agent, or Firm* — Birch, Stewart, Kolasch & Birch, LLP

(57) ABSTRACT

A pneumatic tire 1 includes a carcass 6 extending between bead cores of bead portions via a tread portion 2 and sidewall portions, and a belt layer 7 arranged on an outer side in a tire radial direction of the carcass 6 and inside the tread portion 2. The pneumatic tire 1 has a noise damper 20 arranged on an inner cavity surface of the tread portion 2. Glass transition temperature of the noise damper 20 is in a range of from −55 degrees Celsius to −45 degrees Celsius.

8 Claims, 3 Drawing Sheets

(56) References Cited

U.S. PATENT DOCUMENTS

| | | | |
|---|---|---|---|
| 5,753,359 A | | 5/1998 | Dyer et al. |
| 6,121,367 A | | 9/2000 | Corvasce et al. |
| 6,127,472 A | * | 10/2000 | Kobayashi ................ C08L 9/06 |
| | | | 524/495 |
| 9,180,741 B2 | * | 11/2015 | Oba .......................... B60C 9/22 |
| 2003/0006519 A1 | * | 1/2003 | Kopp .................... B29C 44/445 |
| | | | 264/46.4 |
| 2003/0083424 A1 | | 5/2003 | Duck et al. |
| 2005/0098251 A1 | | 5/2005 | Yukawa |
| 2014/0228459 A1 | | 8/2014 | Shimanaka et al. |
| 2014/0296427 A1 | * | 10/2014 | Burckhardt .......... C08G 18/222 |
| | | | 524/590 |

FOREIGN PATENT DOCUMENTS

| | | | |
|---|---|---|---|
| EP | 3418074 A1 | | 12/2018 |
| JP | 11-286566 | * | 10/1999 |
| JP | 2004-339424 A | | 12/2004 |
| JP | 2009-292461 A | | 12/2009 |
| JP | 2014-520175 A | | 8/2014 |
| JP | 2015-86344 A | | 5/2015 |
| JP | 2016-210250 A | | 12/2016 |
| WO | WO 2016/012945 A1 | | 1/2016 |

OTHER PUBLICATIONS

Machine translation of JP 11-286566, 1999.*
Extended European Search Report, dated Jun. 24, 2019, for European Application No. 17894397.3.
Written Opinion of the International Searching Authority for PCT/JP2017/044581 (PCT/ISA/237) mailed on Mar. 6, 2018.

* cited by examiner

PNEUMATIC TIRE

CROSS-REFERENCE TO RELATED APPLICATIONS

This application is a Continuation of copending application Ser. No. 16/066,022, filed on Jun. 25, 2018, which was filed as PCT International Application No. PCT/JP2017/044581 on Dec. 12, 2017, which claims the benefit under 35 U.S.C. § 119(a) to Patent Application No. 2017-010922, filed in Japan on Jan. 25, 2017, all of which are hereby expressly incorporated by reference into the present application.

TECHNICAL FIELD

The present invention relates to a pneumatic tire provided with a noise damper on an inner cavity surface of a tread portion.

BACKGROUND ART

Conventionally, as a technique for suppressing running noise of a pneumatic tire, as disclosed in Patent Literature 1, a pneumatic tire has been known in which a noise damper made of a sponge material is arranged on the inner cavity surface of the tread portion.

PRIOR ART DOCUMENT

Patent Literature

[Patent Literature 1] Japanese Patent Application Publication No. 2009-292461

However, when running in cold weather, the noise damper becomes hard, therefore, vibration energy of air cannot be sufficiently converted to thermal energy, thereby, the effect of decreasing the running noise is limited.

SUMMARY OF THE INVENTION

Problems to be Solved by the Invention

The present invention was made in view of the above, and a primary object thereof is to provide a pneumatic tire capable of suppressing the running noise even when running in cold weather.

Means for Solving the Problem

The present invention is a pneumatic tire comprising a carcass extending between bead cores of bead portions via a tread portion and sidewall portions, and a belt layer arranged on an outer side in a tire radial direction of the carcass and inside the tread portion, wherein a porous noise damper is arranged on an inner cavity surface of the tread portion, and glass transition temperature of the noise damper is in a range of from −55 degrees Celsius to −45 degrees Celsius.

In the pneumatic tire according to the present invention, it is preferred that density of the noise damper is in a range of from 10 to 40 kg/m3.

In the pneumatic tire according to the present invention, it is preferred that volume V1 of the noise damper is in a range of from 0.4% to 30% of total volume V2 of a tire inner cavity.

In the pneumatic tire according to the present invention, it is preferred that tensile strength of the noise damper is in a range of from 70 to 115 kPa.

In the pneumatic tire according to the present invention, it is preferred that the pneumatic tire further comprises a dumping rubber body having a width W1 in a tire axial direction in a range of from 60% to 130% of a width W2 in the tire axial direction of the belt layer and provided inside the tread portion.

In the pneumatic tire according to the present invention, it is preferred that the damping rubber body is arranged between the carcass and the belt layer.

In the pneumatic tire according to the present invention, it is preferred that the pneumatic tire further comprises a band layer arranged on an outer side in the tire radial direction of the belt layer and inside the tread portion, wherein the damping rubber body is arranged between the belt layer and the band layer.

In the pneumatic tire according to the present invention, it is preferred that the pneumatic tire further comprises a band layer arranged on an outer side in the tire radial direction of the belt layer and inside the tread portion, wherein the damping rubber body is arranged on an outer side in the tire radial direction of the band layer.

In the pneumatic tire according to the present invention, it is preferred that thickness in the tire radial direction of the damping rubber body is not less than 0.3 mm.

In the pneumatic tire according to the present invention, it is preferred that relationship between hardness H1 of the damping rubber body and hardness H2 of a tread rubber arranged on an outer side in the tire radial direction of the belt layer is $0.5 \leq H1/H2 \leq 1.0$.

In the pneumatic tire according to the present invention, it is preferred that a loss tangent tan δ at 0 degree Celsius of a tread rubber arranged on an outer side in the tire radial direction of the belt layer is not less than 0.4, and the loss tangent tan δ at 70 degrees Celsius of the tread rubber is not more than 0.2.

In the pneumatic tire according to the present invention, it is preferred that a tread rubber arranged on an outer side in the tire radial direction of the belt layer is a rubber composition body having a value not less than 20, the value being calculated by (1.4×carbon black content (phr)+silica content (phr))/sulfur content (phr).

Advantageous Effects of the Invention

According to the pneumatic tire of the present invention, the noise damper is arranged on the inner cavity surface of the tread portion, therefore, cavity resonance in a tire inner cavity is suppressed, thereby, the running noise of the pneumatic tire is decreased. Further, in the present invention, the glass transition temperature of the noise damper is in a range of from −55 degrees Celsius to −45 degrees Celsius, therefore, flexibility of the noise damper at low temperature is maintained. Thereby, even when running in cold weather, the noise damper effectively converts the vibration energy of the air into thermal energy, therefore, the running noise is sufficiently decreased.

DESCRIPTION OF THE PREFERRED EMBODIMENT

An embodiment of the present invention will now be described in conjunction with accompanying drawings.

Figure 1:
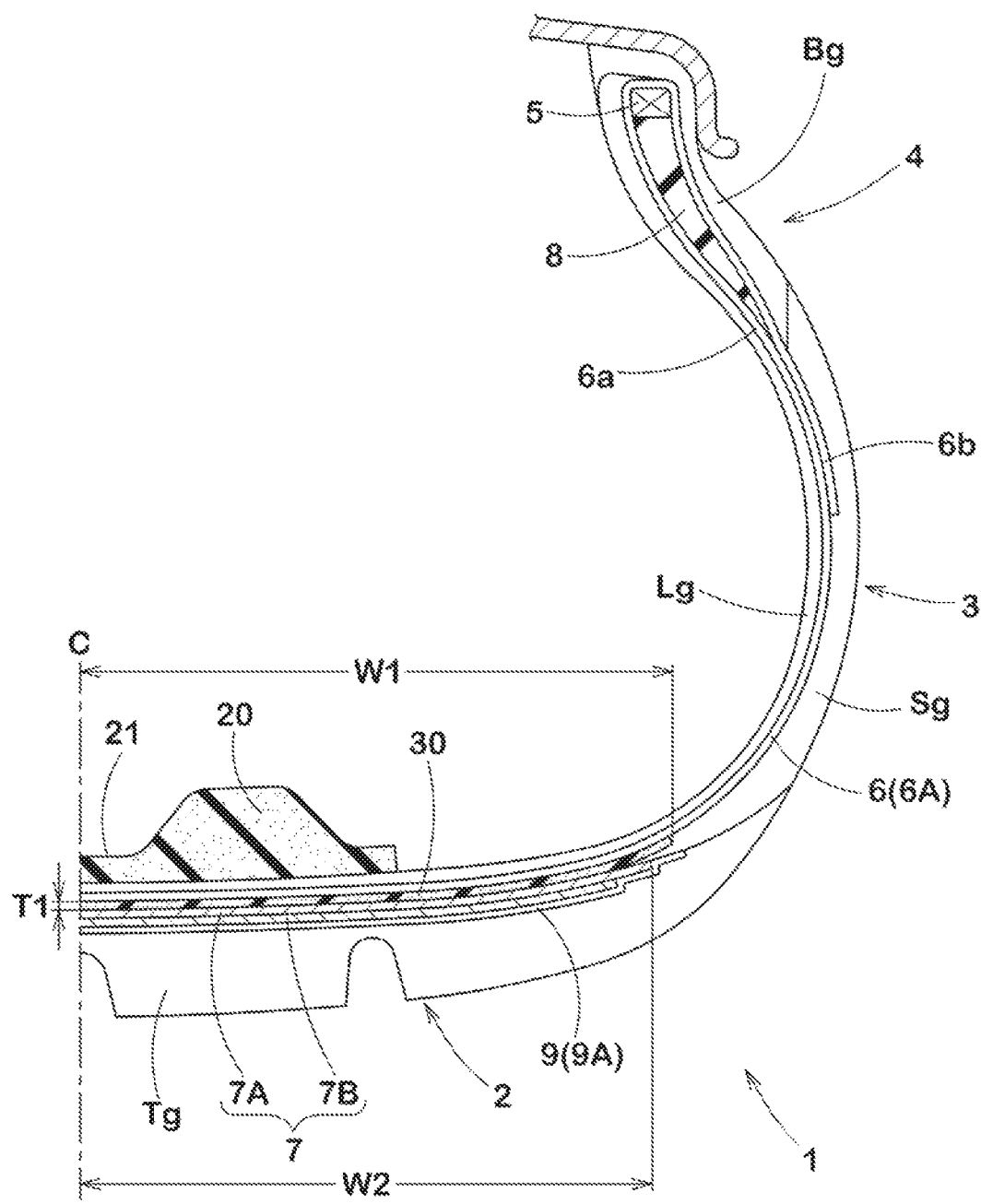
FIG. 1 a cross-sectional view of a pneumatic tire as an embodiment of the present invention.

FIG. 1 is a tire meridian section passing through a tire rotational axis of a pneumatic tire 1 in this embodiment in a standard state. Here, the standard state is a state in which the tire is mounted on a standard rim RM, inflated to a standard inner pressure, and loaded with no tire load. Hereinafter, dimensions and the like of various parts of the tire 1 are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. When the tire is for a passenger car, it is set to 200 kPa uniformly in consideration of the actual use frequency and the like.

As shown in FIG. 1, the pneumatic tire (hereinafter may be simply referred to as "tire") 1 in this embodiment is provided with a carcass 6 extending between bead cores 5 of bead portions 4 via a tread portion 2 and sidewall portions 3, and a belt layer 7 arranged on an outer side in a tire radial direction of the carcass 6 and inside the tread portion 2. In this embodiment, a tire for a passenger car is shown as the tire 1.

The carcass 6 is formed by a single carcass ply 6A, for example. The carcass ply 6A includes a main body portion 6a extending between the bead cores 5 and turned up portions 6b each being turned up around respective one of the bead cores 5 from inside to outside in a tire axial direction so as to be engaged with the respective one of the bead cores 5. In the carcass ply 6A, organic fiber cords made of an organic material such as aromatic polyamide and rayon are used as carcass cords, for example. The carcass cords are arranged at an angle in a range of from 70 to 90 degrees with respect to a tire equator C, for example. The carcass ply 6A is formed by a plurality of the carcass cords covered with topping rubber. Between the main body portion 6a and each of the turned up portions 6b, a bead apex rubber 8 extending radially outwardly from respective one of the bead cores 5 in a tapered manner is arranged.

On an outer side of the carcass 6, a tread rubber Tg for forming a ground contacting surface, sidewall rubbers Sg each for forming an outer surface of respective one of the sidewall portions 3, bead rubbers Bg each for forming an outer surface of respective one of the bead portions 4, and the like are arranged. On the other hand, on an inner side of the carcass 6, an inner liner rubber Lg for keeping tire inner pressure and the like are arranged.

The belt layer 7 in this embodiment is formed by two belt plies 7A and 7B in which belt cords are arranged at an angle in a range of from 15 to 45 degrees with respect to the tire equator C, for example, and the belt plies 7A and 7B are overlapped in the tire radial direction so that the belt cords of the belt ply 7A and the belt cords of the belt ply 7B cross each other. For the belt cords, steel, aramid, rayon or the like is suitably used, for example. By covering a plurality of the belt cords with the topping rubber, the belt plies 7A and 7B are formed.

The pneumatic tire 1 in this embodiment is provided with a band layer 9 arranged on an outer side in the tire radial direction of the belt layer 7. The band layer 9 includes a band ply 9A in which band cords of an organic fiber, nylon cords in this embodiment, are spirally wound at an angle not more than 10 degrees, preferably not more than 5 degrees with respect to the tire circumferential direction.

The pneumatic tire 1 is provided with a noise damper 20 arranged on an inner cavity surface of the tread portion 2. The noise damper 20 is made of a porous sponge material, for example. The sponge material is a cavernous porous structure body including not only a so-called sponge itself having interconnected cells formed by foamed rubber or a synthetic resin but also a web body formed of an animal fiber, a vegetable fiber, or a synthetic fiber and the like integrally interwoven, for example. Further, the "porous structure body" includes not only a body having the interconnected cells but also a body having closed cells. For the noise damper 20 in this embodiment, a sponge material made of polyurethane having interconnected cells is used.

In the sponge material as described above, the pores on the surface of or inside the sponge material convert vibration energy of the vibrating air into thermal energy, therefore, the vibration energy is consumed, thereby, sound (cavity resonance energy) is decreased, therefore, the running noise of the pneumatic tire 1 is decreased. Further, the sponge material is easy to deform such as contraction, flexion, etc., therefore, deformation of the tire during running is not substantially affected. Thereby, it is possible that deterioration of steering stability is prevented. Moreover, specific gravity of the sponge material is very small, therefore, it is possible that deterioration of weight balance of the tire is prevented.

As the sponge material, synthetic resin sponge such as ether type polyurethane sponge, ester type polyurethane sponge, polyethylene sponge, and rubber sponge such as chloroprene rubber sponge (CR sponge), ethylene propylene rubber sponge (EDPM sponge), nitrile rubber sponge (NBR sponge) can be preferably and suitably used, and in particular, a polyurethane type or polyethylene type sponge including an ether type polyurethane sponge is preferred from the point of view of noise damping property, lightweight property, controllability of foaming, durability, and the like.

The noise damper 20 has an elongated belt-like shape having a bottom surface fixed to the inner cavity surface of the tread portion 2 and extends in the tire circumferential direction. At this time, outer end portions in the circumferential direction of the noise damper may be in contact with each other to form a substantially annular shape, or the outer end portions may be spaced apart in the tire circumferential direction.

The noise damper 20 has substantially the same cross-sectional shape at an arbitrary position in the tire circumferential direction except for the outer end portions. In order to prevent collapse and deformation during running, it is preferred that the cross-sectional shape is a flat and horizontally elongated shape in which a height is smaller than a width in the tire axial direction. In particular, as in this embodiment, it is preferred to have a concave groove 21 extending continuously in the tire circumferential direction on a side of the radially inner surface. The concave groove 21 increases a surface area of the noise damper 20, therefore, it is possible that more resonance energy is absorbed, and heat dissipation is increased, therefore, it is possible that the temperature rise of the sponge material is suppressed.

Glass transition temperature of the noise damper 20 is in a range of from −55 degrees Celsius to −45 degrees Celsius. When the above glass transition temperature is less than −55 degrees Celsius, hardness at ordinary temperature is likely to be decreased, therefore, it is possible that the durability is affected. When the above glass transition temperature exceeds −45 degrees Celsius, flexibility of the noise damper 20 at low temperature is impaired, therefore, it is possible that the decrease of the running noise mentioned above becomes small. In the pneumatic tire 1, the glass transition temperature of the noise damper 20 is set within the range of from −55 degrees Celsius to −45 degrees Celsius, therefore, the flexibility of the noise damper at low temperature is maintained. Thereby, even when running in cold weather, the noise damper 20 effectively converts the vibration energy of the air into thermal energy, therefore, the running noise is sufficiently decreased.

In this embodiment, a damping rubber body 30 is disposed inside the tread portion 2. The damping rubber body 30 is arranged between the carcass 6 and the belt layer 7. The damping rubber body 30 is formed of rubber different from the topping rubber included in the carcass ply 6A and the belt ply 7A. A width W1 in the tire axial direction of the damping rubber body 30 is in a range of from 60% to 130% of a width W2 in the tire axial direction of the belt layer 7. In a more preferred embodiment, the width W1 of the damping rubber body 30 is in a range of from 70% to 120% of the width W2 of the belt layer 7. The damping rubber body 30 configured as such suppresses the vibration of the carcass 6 and the belt layer 7 without contributing to the weight increase of the pneumatic tire 1, and in particular contributes to the reduction of the running noise around 160 Hz. Note that if sufficient reduction effect of the running noise can be obtained by the noise damper 20, the damping rubber body 30 may be omitted.

It is preferred that a thickness T1 in the tire radial direction of the damping rubber body 30 is not less than 0.3 mm. By setting the thickness T1 to not less than 0.3 mm, the vibration of the tread portion 2 is more effectively suppressed. Further, by setting a maximum thickness in the tire radial direction of the damping rubber body 30 in a range of from 4% to 20% of a maximum thickness of the tread portion 2, it is possible that the suppression of the running noise of the pneumatic tire 1 and steering stability performance are easily obtained at the same time.

It is preferred that the relationship between hardness H1 of the damping rubber body 30 and hardness H2 of the tread rubber Tg disposed on an outer side in the tire radial direction of the belt layer 7 is $0.5 \leq H1/H2 \leq 1.0$. Here, "rubber hardness" is defined as rubber hardness measured in accordance with Japanese Industrial Standard JIS-K 6253 by a type-A durometer under an environment of 23 degrees Celsius. By the damping rubber body 30 having the hardness H1 described above, the vibration of the tread portion 2 is more effectively suppressed while ensuring durability performance of the tread portion 2.

It is preferred that relationship between the hardness H1 of the damping rubber body 30 and hardness H3 of the topping rubber included in the carcass ply 6A and the belt ply 7A is $0.4 \leq H1/H3 \leq 1.2$. By the damping rubber body 30 of the hardness H1, vibration of the tread portion 2 is more effectively suppressed while securing the durability performance of the tread portion 2.

More specifically, it is preferred that the hardness H1 of the damping rubber body 30 is in a range of from 30 to 73 degrees. With the damping rubber body 30 of hardness H1 configured as such, it is possible that the running noise is easily suppressed and the steering stability performance is improved while suppressing manufacturing cost of the pneumatic tire 1. Further, more specifically, it is preferred that the hardness H2 of the tread rubber Tg is in a range of from 55 to 75 degrees. By the tread rubber Tg of the hardness H2 configured as such, the rigidity of the tread portion 2 is optimized, therefore, it is possible that the steering stability is improved.

In the pneumatic tire 1 in which the noise damper 20 is provided on the inner cavity surface of the tread portion 2, during the puncture repair by using the puncture repair liquid, the puncture repair liquid is locally absorbed in the noise damper 20, therefore, it is possible that uniformity performance after the repair is deteriorated. The term uniformity as used herein refers to the uniformity of weight including the pneumatic tire 1, the noise damper 20, and the puncture repair liquid. If such uniformity is impaired, it is possible that running noise tends to become large. Considering the uniformity performance after the puncture repair, it is preferred that density of the noise damper 20 is not less than 10 kg/m3. On the other hand, by the noise damper 20 having the density not more than 40 kg/m3, it is possible that the running noise in the vicinity of 250 Hz in particular is decreased without increasing the weight of the pneumatic tire 1.

It is preferred that the volume V1 of the noise damper 20 is in a range of from 0.4% to 30% of total volume V2 of the tire inner cavity. The volume V1 of the noise damper 20 is apparent total volume of the noise damper 20, which means the volume determined from the outer shape including the inner cells. The total volume V2 of the tire inner cavity is to be approximately determined by the following formula with respect to a pneumatic tire in the standard state in which the pneumatic tire is mounted on a standard rim, inflated to the standard inner pressure, and loaded with no tire load.

$$V2 = Ax\{(Di-Dr)/2+Dr\} \times \pi$$

In the above formula, "A" is a cross sectional area of the tire inner cavity obtained by CT scanning a tire/rim assembly in the standard state, "Di" is a maximum outer diameter of the inner cavity surface of the tire in the standard state, "Dr" is a diameter of the rim, and "π" is the circumference ratio.

If the volume V1 is less than 0.4% of the total volume V2, it is possible that the vibration energy of the air is not sufficiently converted. If the volume V1 is more than 30% of the total volume V2, it is possible that the weight and the manufacturing cost of the pneumatic tire 1 increases. Further, in the puncture repair by using the puncture repair liquid, it is possible that the uniformity performance after the repair is deteriorated.

It is preferred that tensile strength of the noise damper 20 is in a range of from 70 to 115 kPa. If the tensile strength of the noise damper 20 is less than 70 kPa, it is possible that the durability performance of the noise damper 20 deteriorates. If the tensile strength of the noise damper 20 is more than 115 kPa, when a foreign object such as a nail sticks into the region including the noise damper 20 of the tread portion 2, the noise damper 20 may be pulled by the foreign object, therefore, it is possible that the noise damper 20 comes off the inner cavity surface of the tread portion 2.

It is preferred that a loss tangent tan δ at 0 degree Celsius of the tread rubber Tg is not less than 0.4. Thereby, wet grip performance of the pneumatic tire 1 is improved. Therefore, by setting the volume of the grooves formed in the ground contacting surface of the tread portion 2 to be small and the like, it is possible to further reduce the running noise, for example. It is preferred that the loss tangent tan δ at 70 degrees Celsius of the tread rubber Tg is not more than 0.2. Thereby, rolling resistance of the pneumatic tire 1 is suppressed and deterioration of the fuel efficiency due to inclusion of the noise damper 20 and the damping rubber body 30 is suppressed. Note that the loss tangent tan δ at 0 degrees Celsius and the loss tangent tan δ at 70 degrees Celsius were measured in accordance with Japanese Industrial Standard JIS-K 6394 by using a viscoelasticity spectrometer available from Iwamoto Quartz GlassLab Co., Ltd. under a condition of respective temperature (0 degrees Celsius or 70 degrees Celsius), a frequency of 10 Hz, an initial tensile strain of 10%, and an amplitude of dynamic strain of ±2%.

It is preferred that a value calculated by a following formula: (1.4×carbon black content (phr)+silica content (phr))/sulfur content (phr) of the tread rubber Tg, is not less than 20. Thereby, anti-wear performance is improved. Therefore, by setting depths of the grooves formed in the ground contacting surface of the tread portion 2 to be small and the like, it is possible that the running noise is further decreased, for example. Further, even when distribution of the puncture repair liquid is not uniform, occurrence of uneven wear is suppressed.

While detailed description has been made of the pneumatic tire of the present invention, the present invention can be embodied in various forms without being limited to the illustrated embodiment.

Figure 2:
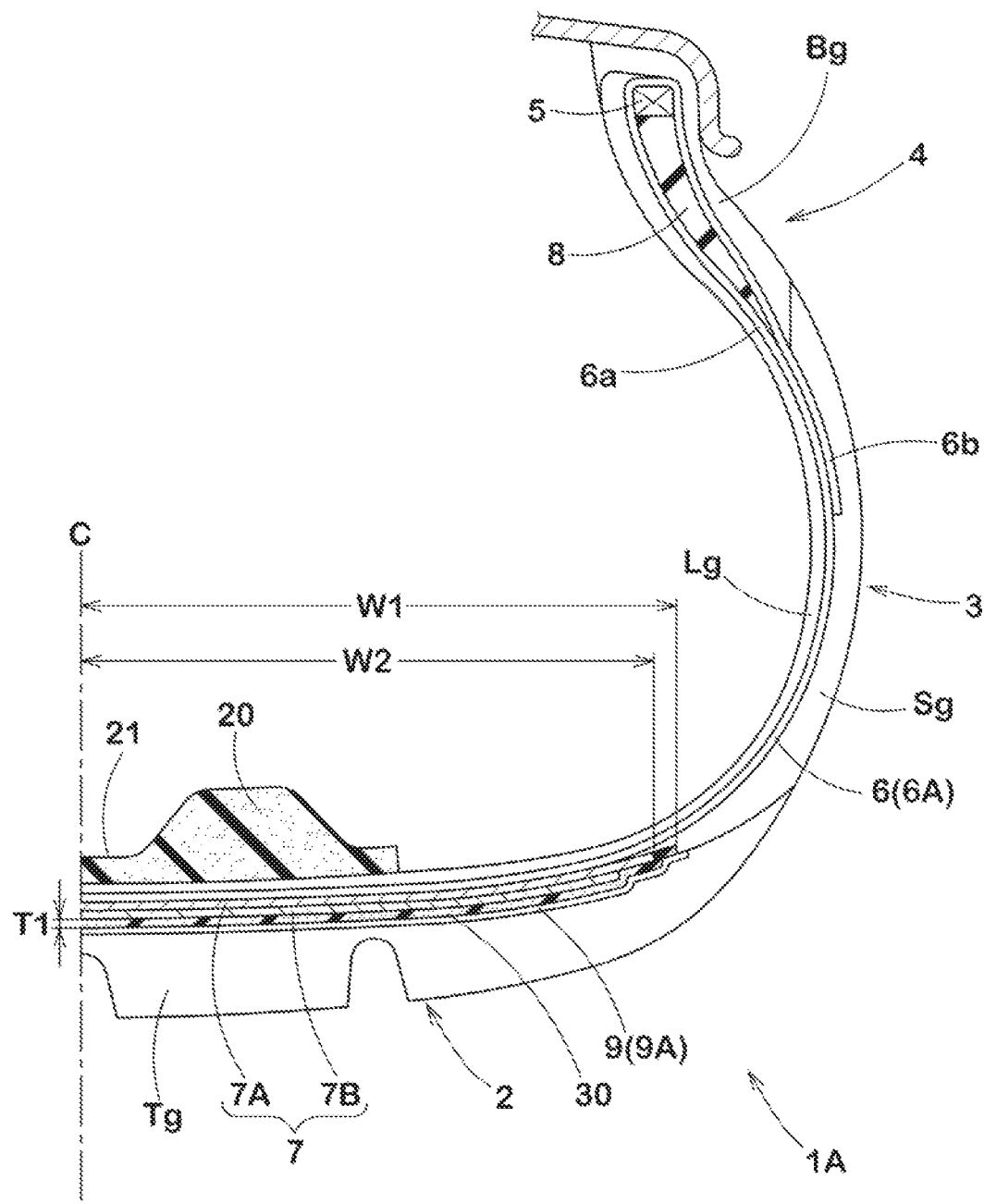
FIG. 2 a cross-sectional view of a pneumatic tire as another embodiment of the present invention.
Figure 3:
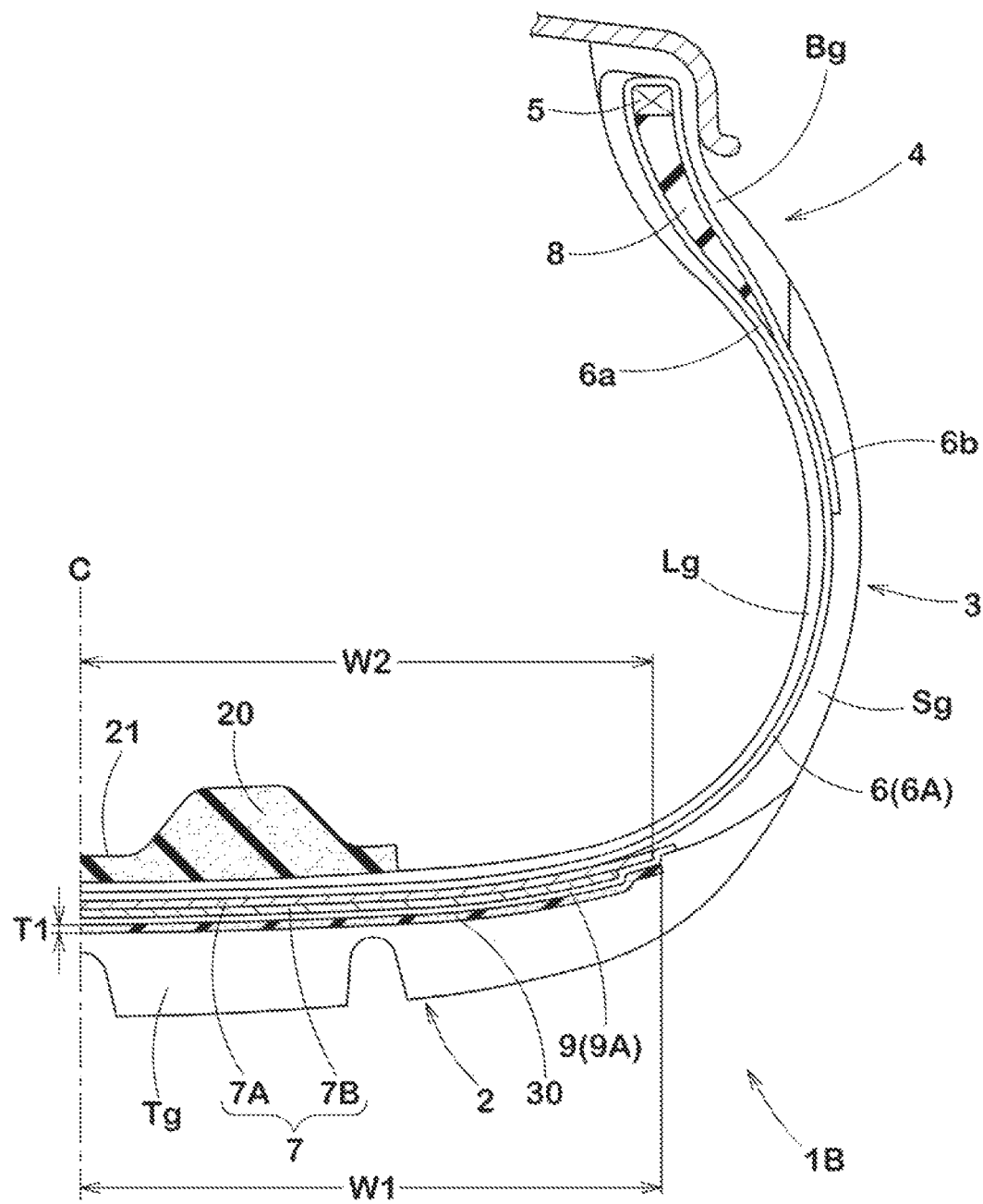
FIG. 3 a cross-sectional view of a pneumatic tire as yet another embodiment of the present invention.

FIG. 2 shows a pneumatic tire 1A as another embodiment of the present invention, for example. The pneumatic tire 1A is different from the pneumatic tire 1 in that the damping rubber body 30 is disposed between the belt layer 7 and the band layer 9. The configuration of the pneumatic tire 1 can be applied to the components of the pneumatic tire 1A that are not described below. In the pneumatic tire 1A, the vibration of the belt layer 7 and the band layer 9 is suppressed by the damping rubber body 30, therefore, the vibration of the tread portion 2 is suppressed eventually.

FIG. 4 shows a pneumatic tire 1B as yet another embodiment of the present invention. The pneumatic tire 1B is different from the pneumatic tire 1 in that the damping rubber body 30 is arranged on an outer side in the tire radial direction of the band layer 9. The configuration of the pneumatic tire 1 can be applied to the components of the pneumatic tire 1B that are not described below. In the pneumatic tire 1B, the vibration of the band layer 9 and the tread rubber Tg is suppressed by the damping rubber body 30, therefore, the vibration of the tread portion 2 is suppressed eventually.

WORKING EXAMPLES

Pneumatic tires of size 165/65R18 having the basic structure shown in FIG. 1 were made by way of test according to the specification listed in Table 1, then the test tires were tested for the noise performance under low temperature environment. The specifications common to each of Examples and References were as follows.

(1) Tread Rubber
 The formulations were as follows.
  Natural rubber (TSR20): 15 (phr)
  SBR 1 (bound styrene content: 28%, vinyl group content: 60%, glass transition point: −25 degrees Celsius, terminal modified): 45 (phr)
  SBR 2 (bound styrene content: 35%, vinyl group content: 45%, glass transition point: −25 degrees Celsius, terminal modified): 25 (phr)
  BR (BR150B available from Ube Industries, Ltd.): 15 (phr)
  Carbon black N220: 5 (phr)
  Silica (VN3): 35 (phr)
  Silica (1115MP): 20 (phr)
  Silane coupling agent Si266: 4 (phr)
  Resin (SYLVARES SA85 available from Arizona Chemical Company): 8 (phr)
  Oil: 4 (phr)
  Wax: 1.5 (phr)
  Age resistor (6C): 3 (phr)
  Stearic acid: 3 (phr)
  Zinc oxide: 2 (phr)
  Sulfur: 2 (phr)
  Vulcanization accelerator (NS): 2 (phr)
  Vulcanization accelerator (DPG): 2 (phr)
 The hardness of the tread rubber of the vulcanized tire was 64 degrees.
 The maximum thickness of the tread rubber was 10 mm.

(2) Damping Rubber Body
 The formulations were as follows.
  Natural rubber (TSR20): 65 (phr)
  SBR (Nipol 1502): 35 (phr)
  Carbon black N220: 52 (phr)
  Oil: 15 (phr)
  Stearic acid: 1.5 (phr)
  Zinc oxide: 2 (phr)
  Sulfur: 3 (phr)
  Vulcanization accelerator (CZ): 1 (phr)
 The hardness of the damping rubber body of the vulcanized tire was 58 degrees.
 The maximum thickness of the damping rubber body was 1 mm.

(3) Noise Damper
 The volume was 15% of the total volume of the tire inner cavity.
 The density was 27 kg/m3.

(4) Belt Cords
 The angle of the belt cords with respect to the tire equator was 41 degrees.
 The test methods were as follows.
 Each of the test tires was mounted on a rim of 18×7JJ and brought into a laboratory in which the room temperature is set at −50 degrees Celsius. Each of the test tires was run at a speed of 60 km/h on a drum having a replica road surface with a diameter of 3.3 m under conditions of an internal pressure of 320 kPa and a load of 4.8 kN, and 25 mm in front and 25 mm in height The sound pressure level (dB) at the spaced position was measured by a microphone. The results are indicated by an index based on Example 1 being 100, wherein the larger the numerical value, the smaller the running noise is, which is better.

TABLE 1

|  | Ref. 1 | Ref. 2 | Ex. 1 | Ex. 2 | Ex. 3 |
|---|---|---|---|---|---|
| Presence or Absence of Noise damper | absence | presence | presence | presence | presence |
| Glass transition temperature of Noise damper [degree Celsius] | — | −30 | −50 | −55 | −45 |
| Presence or Absence of Damping rubber body | absence | absence | absence | absence | absence |
| Noise performance [index] | 80 | 85 | 100 | 100 | 95 |

As is apparent from Table 1, it was confirmed that the noise performance in the low temperature environment of the pneumatic tires as Examples 1 to 3 was significantly improved as compared with References 1 and 2.

Further, as shown in Table 2, the pneumatic tires as Examples 4 to 8 were made by way of test and the noise performance under the low temperature environment was tested. The test method was as follows.

<Noise Performance>

Sound pressure level was measured by the same method as described above. The results are indicated by an index based on the Example 5 being 100, wherein the larger the numerical value, the smaller the running noise is, which is better.

TABLE 2

|  | Ex. 4 | Ex. 5 | Ex. 6 | Ex. 7 | Ex. 8 |
|---|---|---|---|---|---|
| Presence or Absence of Noise damper | presence | presence | presence | presence | presence |
| Glass transition temperature of Noise damper [degree Celsius] | −50 | −50 | −50 | −50 | −50 |
| Presence or Absence of Damping rubber body | absence | presence | presence | presence | presence |
| Width W1 of Damping rubber body/Width W2 of Belt layer [%] | — | 100 | 80 | 70 | 130 |
| Noise performance [index] | 90 | 100 | 95 | 98 | 105 |

Further, as shown in Table 3, the pneumatic tires as Examples 9 to 12 were made by way of test and the noise performance under the low temperature environment and the steering stability performance were tested. The test methods were as follows.

<Noise Performance>

The sound pressure level was measured by the same method as described above. The results are indicated by an index based on the Example 11 being 100, wherein the larger the numerical value, the smaller the running noise is, which is better.

<Steering Stability Performance>

Each of the test tires was mounted on a rim of 18×7JJ, mounted on all wheels of a car (domestically produced FR car with displacement of 2500 cc) under the condition of the inner pressure of 320 kPa, and then, while the car was driven on a dry asphalt test course, characteristics related to steering response, rigid impression, grip, and the like were evaluated by the driver's feeling. The results are indicated by an evaluation point based on the Example 11 being 100, wherein a larger numerical value is better.

TABLE 3

|  | Ex. 9 | Ex. 10 | Ex. 11 | Ex. 12 |
|---|---|---|---|---|
| Presence or Absence of Noise damper | presence | presence | presence | presence |
| Glass transition temperature of Noise damper [degree Celsius] | −50 | −50 | −50 | −50 |
| Presence or Absence of Damping body | presence | presence | presence | presence |
| Width W1 of Damping rubber body/Width W2 of Belt layer [%] | 100 | 100 | 100 | 100 |
| Steering stability [index] | 95 | 100 | 100 | 98 |

Furthermore, as shown in Table 4, the pneumatic tires as Examples 13 to 17 having the damping rubber body of different rigidity were made by way of test, and then the noise performance under the low temperature environment was tested and the manufacturing cost was calculated. The test method and the calculation method were as follows.

<Noise Performance>

The sound pressure level was measured by the same method as described above. The results are indicated by an index based on the Example 15 being 100, wherein the larger the numerical value, the smaller the running noise is, which is better.

<Manufacturing Cost>

Manufacturing cost required to manufacture a single tire was calculated. The results are indicated by an index based on the Example 15 being 100, wherein the larger the numerical value, the smaller the manufacturing cost is, which is better.

TABLE 4

|  | Ex. 13 | Ex. 14 | Ex. 15 | Ex. 16 | Ex. 17 |
| --- | --- | --- | --- | --- | --- |
| Presence or Absence of Noise damper | presence | presence | presence | presence | presence |
| Glass transition temperature of Noise damper [degree Celsius] | −50 | −50 | −50 | −50 | −50 |
| Presence or Absence of Damping rubber body | presence | presence | presence | presence | presence |
| Width W1 of Damping rubber body/Width W2 of Belt layer [%] | 100 | 100 | 100 | 100 | 100 |
| Hardness H1 of Damping rubber body/Hardness H2 of Tread rubber | 0.4 | 0.5 | 0.7 | 1.0 | 1.2 |
| Noise performance [index] | 96 | 98 | 100 | 102 | 102 |
| Manufacturing cost [index] | 102 | 102 | 100 | 98 | 96 |

Furthermore, as shown in Table 5, the pneumatic tires as Examples 18 to 22 were made by way of test, and then the uniformity performance after the puncture repair and the noise performance under the low temperature environment were tested. The test methods were as follows.

<Uniformity Performance>

Each of the test tires was mounted on a rim of 18×7JJ and injected with puncture repair material simulating puncture repair, and then radial force variation (RFV) was measured under the condition of the inner pressure of 320 kPa in accordance with uniformity test condition of Japanese Automobile Standards Organization JASO C607:2000. The evaluation speed was 10 km/h. The results are indicated by an index based on the Example 20 being 100, wherein the larger the numerical value, the smaller the RFV is, which is better.

<Noise Performance>

The sound pressure level was measured by the same method as described above. The results are indicated by an index based on the Example 20 being 100, wherein the larger the numerical value, the smaller the running noise is, which is better.

Furthermore, as shown in Table 6, the pneumatic tires as Examples 23 to 27 were made by way of test, and then the uniformity performance after the puncture repair and the noise performance under the low temperature environment were tested. The test methods were as follows.

<Uniformity Performance>

The RFV was measured by the same method as described above. The results are indicated by an index based on the Example 25 being 100, wherein the larger the numerical value, the smaller the RFV is, which is better.

<Noise Performance>

The sound pressure level was measured by the same method as described above. The results are indicated by an index based on the Example 25 being 100, wherein the larger the numerical value, the smaller the running noise is, which is better.

TABLE 5

|  | Ex. 18 | Ex. 19 | Ex. 20 | Ex. 21 | Ex. 22 |
| --- | --- | --- | --- | --- | --- |
| Presence or Absence of Noise damper | presence | presence | presence | presence | presence |
| Glass transition temperature of Noise damper [degree Celsius] | −50 | −50 | −50 | −50 | −50 |
| Presence or Absence of Damping rubber body | presence | presence | presence | presence | presence |
| Width W1 of Damping rubber body/Width W2 of Belt layer [%] | 100 | 100 | 100 | 100 | 100 |
| Density of Noise damper [kg/m3] | 5 | 10 | 27 | 40 | 50 |
| uniformity performance [index] | 95 | 97 | 100 | 103 | 103 |
| Noise performance [index] | 103 | 103 | 100 | 97 | 95 |

TABLE 6

|  | Ex. 23 | Ex. 24 | Ex. 25 | Ex. 26 | Ex. 27 |
| --- | --- | --- | --- | --- | --- |
| Presence or Absence of Noise damper | presence | presence | presence | presence | presence |
| Glass transition temperature of Noise damper [degree Celsius] | −50 | −50 | −50 | −50 | −50 |
| Presence or Absence of Damping rubber body | presence | presence | presence | presence | presence |
| Width W1 of Damping rubber body/Width W2 of Belt layer [%] | 100 | 100 | 100 | 100 | 100 |
| Volume V1 of Noise damper/Total volume V2 of Tire inner cavity [%] | 0.3 | 0.4 | 15.0 | 30.0 | 35.0 |
| uniformity performance [index] | 103 | 103 | 100 | 97 | 95 |
| Noise performance [index] | 95 | 97 | 100 | 103 | 103 |

Furthermore, as shown in Table 7, the pneumatic tires as Examples 28 to 32 were made by way of test, and then the durability performance of the noise damper and separation resistance performance of the noise damper when a nail sticks were tested. The test methods were as follows.

<Durability Performance of Noise Damper>

Each of the test tires was mounted on a rim of 18×7JJ and then, by using a drum testing machine, a distance until the noise damper and its vicinity were damaged was measured under the conditions of the inner pressure of 320 kPa, the tire load of 4.8 kN, and the speed of 80 km/h. The results are indicated by an index based on the Example 30 being 100, wherein the larger the numerical value, the higher the durability is, which is better.

<Separation Resistance Performance of Noise Damper when Nail Sticks>

Each of the test tires was mounted on a rim of 18×7JJ and punctured by rolling on a nail, then the damaged part was disassembled to measure the area of separation of the noise damper from the inner cavity surface of the tread portion due to the noise damper being pulled by the nail. The results are indicated by an index based on the Example 30 being 100, wherein the larger the numerical value, the higher the separation resistance performance is, which is better.

TABLE 7

|  | Ex. 28 | Ex. 29 | Ex. 30 | Ex. 31 | Ex. 32 |
| --- | --- | --- | --- | --- | --- |
| Presence or Absence of Noise damper | presence | presence | presence | presence | presence |
| Glass transition temperature of Noise damper [degree Celsius] | −50 | −50 | −50 | −50 | −50 |
| Presence or Absence of Damping rubber body | presence | presence | presence | presence | presence |
| Width W1 of Damping rubber body/Width W2 of Belt layer [%] | 100 | 100 | 100 | 100 | 100 |
| Tensile strength of Noise damper [kPa] | 60 | 70 | 90 | 115 | 125 |
| Durability of Noise damper [index] | 95 | 97 | 100 | 103 | 103 |
| separation resistance performance of Noise damper when Nail sticks [index] | 103 | 103 | 100 | 97 | 95 |

Furthermore, as shown in Table 8, the pneumatic tires as Examples 33 to 35 were made by way of test, and then the noise performance under the low temperature environment was tested. The test method was as follows.

<Noise Performance>

The sound pressure level was measured by the same method as described above. The results are indicated by an index based on the Example 1 being 100, wherein the larger the numerical value, the smaller the running noise is, which is better.

TABLE 8

|  | Ex. 33 | Ex. 34 | Ex. 35 |
| --- | --- | --- | --- |
| Presence or Absence of Noise damper | presence | presence | presence |
| Glass transition temperature of Noise damper [degree Celsius] | −50 | −55 | −45 |
| Presence or Absence of Damping rubber body | presence | presence | presence |
| Width W1 of Damping rubber body/Width W2 of Belt layer [%] | 100 | 100 | 100 |
| Noise performance [index] | 110 | 110 | 105 |

Furthermore, as shown in Table 9, the pneumatic tires as Examples 36 to 40 were made by way of test, and then the uniformity performance after the puncture repair and the noise performance under the low temperature environment were tested. The test methods were as follows.

<Uniformity Performance>

The radial force variation (RFV) was measured by the same method as described above. The results are indicated by an index based on the Example 20 being 100, wherein the larger the numerical value, the smaller the RFV is, which is better.

<Noise Performance>

The sound pressure level was measured by the same method as described above. The results are indicated by an index based on the Example 20 being 100, wherein the larger the numerical value, the smaller the running noise is, which is better.

TABLE 9

|  | Ex. 36 | Ex. 37 | Ex. 38 | Ex. 39 | Ex. 40 |
| --- | --- | --- | --- | --- | --- |
| Presence or Absence of Noise damper | presence | presence | presence | presence | presence |
| Glass transition temperature of Noise damper [degree Celsius] | −50 | −50 | −50 | −50 | −50 |
| Presence or Absence of Damping rubber body | absence | absence | absence | absence | absence |
| Density of Noise damper [kg/m3] | 5 | 10 | 27 | 40 | 50 |
| uniformity performance [index] | 95 | 97 | 100 | 103 | 103 |
| Noise performance [index] | 95 | 95 | 92 | 89 | 87 |

Furthermore, as shown in Table 10, the pneumatic tires as Examples 41 to 45 were made by way of test, and then the uniformity performance after the puncture repair and the noise performance under the low temperature environment were tested. The test methods were as follows.

<Uniformity Performance>

The radial force variation (RFV) was measured by the same method as described above. The results are indicated by an index based on the Example 25 being 100, wherein the larger the numerical value, the smaller the RFV is, which is better.

<Noise Performance>

The sound pressure level was measured by the same method as described above. The results are indicated by an index based on the Example 25 being 100, wherein the larger the numerical value, the smaller the running noise is, which is better.

TABLE 10

|  | Ex. 41 | Ex. 42 | Ex. 43 | Ex. 44 | Ex. 45 |
|---|---|---|---|---|---|
| Presence or Absence of Noise damper | presence | presence | presence | presence | presence |
| Glass transition temperature of Noise damper [degree Celsius] | −50 | −50 | −50 | −50 | −50 |
| Presence or Absence of Damping rubber body | absence | absence | absence | absence | absence |
| Volume V1 of Noise damper/Total volume V2 of Tire inner cavity [%] | 0.3 | 0.4 | 15.0 | 30.0 | 35.0 |
| uniformity performance [index] | 103 | 103 | 100 | 97 | 95 |
| Noise performance [index] | 87 | 88 | 92 | 95 | 95 |

DESCRIPTION OF THE REFERENCE SIGNS 1 pneumatic tire
2 tread portion
3 sidewall portion
4 bead portion
5 bead core
6 carcass
20 noise damper
30 damping rubber body

The invention claimed is:

1. A pneumatic tire comprising:
a carcass extending between bead cores of bead portions via a tread portion and sidewall portions,
a belt layer arranged on an outer side in a tire radial direction of the carcass and inside the tread portion, and
a band layer arranged on an outer side in the tire radial direction of the belt layer and inside the tread portion, the band layer having an axial width larger than an axial width of the belt layer so as to cover the entire belt layer,
wherein
a porous noise damper is arranged on an inner cavity surface of the tread portion,
the noise damper has a glass transition temperature of −55 degrees Celsius to −45 degrees Celsius,
the tread portion arranged radially outside the belt layer is formed from a tread rubber having a hardness in a range of from 55 to 75 degrees,
the tread rubber loss tangent tan δ at 0 degree Celsius is not less than 0.4, and
the tread rubber loss tangent tan δ at 70 degrees Celsius is not more than 0.2.

2. The pneumatic tire according to claim 1, wherein the noise damper density is in a range of from 10 to 40 kg/m$^3$.

3. The pneumatic tire according to claim 1, wherein the noise damper volume V1 is in a range of from 0.4% to 30% of the tire inner cavity total volume V2.

4. The pneumatic tire according to claim 1, wherein the noise damper tensile strength is in a range of from 70 to 115 kPa.

5. The pneumatic tire according to claim 1, wherein the tread rubber is a rubber composition body having a value not less than 20, the value being calculated by (1.4×carbon black content (phr)+silica content (phr))/sulfur content (phr).

6. The pneumatic tire according to claim 1, wherein the noise damper is made of a porous sponge material having interconnected cells and/or closed cells.

7. The pneumatic tire according to claim 6, wherein the sponge material is a synthetic resin sponge that is an ether type polyurethane sponge, ester type polyurethane sponge, or polyethylene sponge.

8. The pneumatic tire according to claim 6, wherein the sponge material is a rubber sponge that is a chloroprene rubber sponge, ethylene propylene rubber sponge, or nitrile rubber sponge.

* * * * *